(12) United States Patent
Jin et al.

(10) Patent No.: US 11,330,645 B2
(45) Date of Patent: May 10, 2022

(54) COMMUNICATION METHOD AND COMMUNICATIONS DEVICE IN CENTRALIZED UNIT-DISTRIBUTED UNIT ARCHITECTURE

(71) Applicant: HUAWEI TECHNOLOGIES CO., LTD., Guangdong (CN)

(72) Inventors: Yinghao Jin, Shanghai (CN); Feng Han, Shanghai (CN); Hang Zhang, Ottawa (CA); Wei Tan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 86 days.

(21) Appl. No.: 16/992,787

(22) Filed: Aug. 13, 2020

(65) Prior Publication Data
US 2020/0374947 A1 Nov. 26, 2020

Related U.S. Application Data

(63) Continuation of application No. PCT/CN2019/070363, filed on Jan. 4, 2019.

(30) Foreign Application Priority Data

Feb. 14, 2018 (CN) .......................... 201810152264.7

(51) Int. Cl.
*H04W 76/10* (2018.01)
*H04W 24/04* (2009.01)
(Continued)

(52) U.S. Cl.
CPC ........... *H04W 76/10* (2018.02); *H04W 24/04* (2013.01); *H04W 28/0263* (2013.01); *H04W 28/0278* (2013.01); *H04W 88/085* (2013.01)

(58) Field of Classification Search
CPC . H04W 76/10; H04W 24/04; H04W 28/0263; H04W 28/0278; H04W 88/085
See application file for complete search history.

(56) References Cited

U.S. PATENT DOCUMENTS

2010/0019899 A1* 1/2010 Zhang .............. H04N 21/23614
340/540
2018/0368109 A1* 12/2018 Kim .................. H04W 72/0433
(Continued)

FOREIGN PATENT DOCUMENTS

CN 106162730 A 11/2016
WO 2017193974 A1 11/2017

OTHER PUBLICATIONS

3GPP Draft, "Report of 3GPP TSG RAN3 ad hoc meeting NR#02," draft report_RAN3_07-170824, retrieved from URL: <https://www.3gpp.org/ftp/TSG_RAN/WG3_lu/TSGR3_97/Report/History>, Aug. 25, 2017, 113 pages.
(Continued)

*Primary Examiner* — Ajay Cattungal
(74) *Attorney, Agent, or Firm* — Fish & Richardson P.C.

(57) ABSTRACT

Implementations of this application provide communications methods, devices, and chips. In an implementation, a method comprises: sending, by a centralized unit user plane (CU-UP) of an access network to a centralized unit control plane (CU-CP) of the access network, an interface setup request message to request to setup an E1 interface, the interface setup request message comprises an identity of a public land mobile network (PLMN) served by the CU-UP and a network slice identifier corresponding to the public land mobile network, wherein the network slice identifier identifies single network slice selection assistance information (S-NSSAI) or an S-NSSAI list; and sending, by the
(Continued)

CU-CP, an interface setup response message to the CU-UP after receiving the interface setup request message.

20 Claims, 5 Drawing Sheets

(51) Int. Cl.
*H04W 28/02* (2009.01)
*H04W 88/08* (2009.01)

(56) References Cited

U.S. PATENT DOCUMENTS

| | | | |
|---|---|---|---|
| 2019/0069333 A1* | 2/2019 | Kim | H04W 36/0033 |
| 2019/0075552 A1* | 3/2019 | Yu | H04W 72/04 |
| 2020/0367109 A1* | 11/2020 | Chen | H04W 28/24 |
| 2021/0058858 A1* | 2/2021 | Qiao | H04W 48/16 |

OTHER PUBLICATIONS

3GPP TS 23.501 V15.0.0 (Dec. 2017), 3rd Generation Partnership Project; Technical Specification Group Services and System Aspects; System Architecture for the 5G System; Stage 2(Release 15), Dec. 2017, 181 pages.
3GPP TS 38.300 V15.0.0 (Dec. 2017), 3rd Generation Partnership Project; Technical Specification Group Radio Access Network; NR; NR and NG-RAN Overall Description; Stage 2 (Release 15), Dec. 2017, 68 pages.
3GPP TS 38.413 V0.6.0 (Jan. 2018), "3rd Generation Partnership Project; Technical Specification Group Radio Access Network; NG-RAN; NG Application Protocol (NGAP) (Release 15)," Jan. 2018, 94 pages.
3GPP TS 38.423 V0.6.0 (Jan. 2018), "3rd Generation Partnership Project; Technical Specification Group Radio Access Network; NG-RAN; Xn application protocol (XnAP) (Release 15)," Jan. 2018, 76 pages.
3GPP TS 38.473 V15.0.0 (Dec. 2017), "3rd Generation Partnership Project; Technical Specification Group Radio Access Network; NG-RAN; F1 application protocol (F1AP) (Release 15)," Dec. 2017, 90 pages.
Ericsson et al., "Resolution of E1 open issues—interface design," 3GPP TSG-RAN WG3 #97, R3-173334, Berlin, Germany, Aug. 21-25, 2017, 5 pages.
Ericsson et al., "SgNB addition in disaggregated gNB with E1 interface," 3GPP TSG-RAN WG3 #97, R3-173255, Berlin, Germany, Aug. 21-25, 2017, 4 pages.
ETSI MCC, "Report of 3GPP TSG RAN3 ad hoc meeting NR#02," 3GPP TSG RAN meeting #97, R3-172652, Spokane, USA, Apr. 3-7, 2017, 166 pages.
Intel Corporation, "General principles of separation of CP and UP for high level functional split," 3GPP TSG RAN WG3 Meeting NR#2, R3-172285, Qingdao, China, Jun. 26-28, 2017, 5 pages.
PCT International Search Report and Written Opinion issued in International Application No. PCT/CN2019/070363 dated Mar. 19, 2019, 16 pages (with English translation).
Search Report issued in Chinese Application No. 201810993003.8 dated Nov. 1, 2018, 8 pages.
CATT, "Discussion on F1 SETP procedure," 3GPP TSG RAN WG3 #97bis, R3-173595, Prague, Czech Republic, Oct. 9-13, 2017, 8 pages.
Office Action issued in Korean Application No. 2020-7025055 dated Jun. 8, 2021, 15 pages (with English translation).
3GPP TS 36.423 V9.0.0 (Sep. 2009), "3rd Generation Partnership Project; Technical Specification Group Radio Access Network; Evolved Universal Terrestrial Radio Access Network (E-UTRAN);X2 application protocol (X2AP)Release 9)," Sep. 2009, 2 pages.
Ericsson, "Slice configuration at NG and Xn Setup," 3GPP TSG-RAN WG3 Meeting #97bis, R3-173931, Prague, Czech Republic, Oct. 9-13, 2017, 5 pages.
Extended European Search Report issued in European Application No. 19754269.9 dated Feb. 17, 2021, 12 pages.
Huawei, "Slice Information Exchange over NG," 3GPP TSG-RAN WG3 Meeting AH-1801, R3-180479, Sophia Antipolis, France, Jan. 22-26, 2018, 4 pages.
Masini et al., "Report from the RAN WG3#97bis Meeting," 3GPP TSG WG RAN3 Meeting #97bis, R3-174261, Prague, Czech Republic, Oct. 9-13, 2017, 234 pages.
Nokia et al., "On Standardized Slice/Service Types," SA WG2 Meeting #121, S2-173974, Hang Zhou, China, May 15-19, 2017, 4 pages.
ZTE, "Further consideration on E1 interface setup," 3GPP TSG RAN WG3 NR ADHOC, R3-180128, Sophia-Antipolis, France, Jan. 22-26, 2018, 2 pages.

\* cited by examiner

COMMUNICATION METHOD AND COMMUNICATIONS DEVICE IN CENTRALIZED UNIT-DISTRIBUTED UNIT ARCHITECTURE

CROSS-REFERENCE TO RELATED APPLICATIONS

This application is a continuation of International Application No. PCT/CN2019/070363, filed on Jan. 4, 2019, which claims priority to Chinese Patent Application No. 201810152264.7, filed on Feb. 14, 2018. The disclosures of the aforementioned applications are hereby incorporated by reference in their entireties.

TECHNICAL FIELD

This application relates to the field of communications technologies, and in particular, to a communication method and a communications device.

BACKGROUND

With development of communications technologies, a new network architecture is proposed, and functions of a base station in an access network are separated. Some functions of the base station are deployed on a centralized unit (Centralized Unit, CU), and other functions are deployed on a distributed unit (Distributed Unit, DU). In some cases, the CU is further separated. For example, the CU may include a control plane CU (CU-CP) and a user plane CU (CU-UP). In such a network architecture, how to ensure normal communication is a problem worthy of consideration.

SUMMARY

This application provides a communication method and a communications device, to ensure normal communication in the foregoing network architecture.

According to a first aspect, a communication method is provided, and includes: receiving, by a centralized unit control plane CU-CP entity of an access network, an interface setup request message from a centralized unit user plane CU-UP entity of the access network, where the interface setup request message comprises information about a network slice supported by the CU-UP; and sending, by the CU-CP, an interface setup response message to the CU-UP after receiving the interface setup request message.

In this embodiment, the CU-UP sends the interface setup request, so that the CU-CP obtains the network slice supported by the CU-UP. In this case, by considering the network slice, the CU-CP may select a proper CU-UP for a session or a bearer with reference to the network slice supported by the CU-UP, to avoid a session or bearer setup failure caused when the CU-UP does not support a network slice corresponding to the session or the bearer, avoid communication interruption, and ensure normal communication. In addition, the CU-UP sends the interface setup request, so that the CU-CP obtains the network slice supported by the CU-UP as soon as possible. It is not required that the CU-CP initiates, only when setting up a session or a bearer, obtaining the network slice supported by the CU-UP, thereby saving signaling overheads, avoiding latency, and further ensuring efficient and normal communication.

In a possible design, the information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network. In this case, the CU-CP may further understand a difference between network slices deployed on CU-UPs at a TA granularity, a cell granularity, or an operator granularity, thereby further ensuring normal communication.

In a possible design, the interface setup request message further comprises capacity information of the network slice supported by the CU-UP. The network slice supported by the CU-UP may include a network slice whose resource is isolated. The network slice supported by the CU-UP may alternatively include a network slice whose resource is shared. The interface setup request message further comprises capacity information of the network slice supported by the CU-UP, so that the CU-CP knows the capacity information of the network slice in detail, to avoid session rejection caused due to misjudgment of the capacity information, further avoid communication interruption, and ensure communication quality.

In a possible design, the CU-CP sends, to a core network device, information about a network slice supported by the access network, and the network slice supported by the access network includes a network slice supported by both the CU-CP and the CU-UP.

In a possible design, the method further includes: sending, by the CU-CP, a load request message to the CU-UP, where the load request message is used to request to obtain load information of the network slice supported by the CU-UP. Optionally, the load request message comprises an identifier of the network slice supported by the CU-UP.

In a possible design, the interface setup request message further comprises service range information of the CU-UP. The service range information includes at least one of the following: the identity of the cell served by the CU-UP, the identity of the tracking area served by the CU-UP, an identity of a distributed unit DU connected to the CU-UP, or the identity of the public land mobile network served by the CU-UP. The information may help the CU-CP select the proper CU-UP to serve UE and ensure normal communication.

In a possible design, the interface setup response message comprises information about a network slice supported by the CU-CP.

In a possible design, the interface setup response message comprises capacity information of the network slice supported by the CU-CP.

According to a second aspect, a communication method is provided, and includes: sending, by a centralized unit user plane CU-UP entity of an access network, an interface setup request message to a centralized unit control plane CU-CP entity of the access network, where the interface setup request message comprises information about a network slice supported by the CU-UP; and receiving, by the CU-UP, an interface setup response message from the CU-CP.

In a possible design, the information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network.

In a possible design, the interface setup request message further comprises capacity information of the network slice supported by the CU-UP.

In a possible design, the method further includes: receiving, by the CU-UP, a configuration message from a network management system, where the configuration message comprises the information about the network slice supported by the CU-UP. The network management system directly configures, for the CU-UP, the information about the network slice supported by the CU-UP, to avoid a forwarding process in which the information about the network slice supported by the CU-UP is first configured for the CU-CP and then is forwarded to the CU-UP, and reduce signaling overheads.

In a possible design, the method further includes: receiving, by the CU-UP, a load request message from the CU-CP, where the load request message is used to request to obtain load information of the network slice supported by the CU-UP. Further, optionally, an identifier of the network slice supported by the CU-UP is carried in the load request message.

In a possible design, the interface setup request message further comprises service range information of the CU-UP. The service range information includes at least one of the following: the identity of the cell served by the CU-UP, the identity of the tracking area served by the CU-UP, an identity of a distributed unit DU connected to the CU-UP, or the identity of the public land mobile network served by the CU-UP.

According to a third aspect, a communications device is provided. The communications device is a centralized unit control plane CU-CP entity of an access network. The communications device includes a receiver, configured to receive an interface setup request message from a centralized unit user plane CU-UP entity of the access network, where the interface setup request message comprises information about a network slice supported by the CU-UP. The communications device further includes a first transmitter, configured to send an interface setup response message to the CU-UP.

In a possible design, the information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network.

In a possible design, the interface setup request message further comprises capacity information of the network slice supported by the CU-UP.

In a possible design, the device further includes a second transmitter. The second transmitter is configured to send, to a core network device, information about a network slice supported by the access network. The network slice supported by the access network includes a network slice supported by both the CU-CP and the CU-UP.

In a possible design, the first transmitter is further configured to send a load request message to the CU-UP. The load request message is used to request to obtain load information of the network slice supported by the CU-UP. Further, optionally, an identifier of the network slice supported by the CU-UP is carried in the load request message.

In a possible design, the interface setup request message further comprises service range information of the CU-UP. The service range information includes at least one of the following: the identity of the cell served by the CU-UP, the identity of the tracking area served by the CU-UP, an identity of a distributed unit DU connected to the CU-UP, or the identity of the public land mobile network served by the CU-UP.

According to a fourth aspect, a communications device is provided. The communications device is a centralized unit user plane CU-UP entity of an access network. The communications device includes a transmitter, configured to send an interface setup request message to a centralized unit control plane CU-CP entity of the access network. The interface setup request message comprises information about a network slice supported by the CU-UP. The communications device further includes a first receiver, configured to receive an interface setup response message from the CU-CP.

In a possible design, the information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network.

In a possible design, the interface setup request message further comprises capacity information of the network slice supported by the CU-UP.

In a possible design, the communications device further includes a second receiver. The second receiver is configured to receive a configuration message from a network management system. The configuration message comprises the information about the network slice supported by the CU-UP.

In a possible design, the first receiver is further configured to receive a load request message from the CU-CP. The load request message is used to request to obtain load information of the network slice supported by the CU-UP. Further, optionally, an identifier of the network slice supported by the CU-UP is carried in the load request message.

In a possible design, the interface setup request message further comprises service range information of the CU-UP. The service range information includes at least one of the following: the identity of the cell served by the CU-UP, the identity of the tracking area served by the CU-UP, an identity of a distributed unit DU connected to the CU-UP, or the identity of the public land mobile network served by the CU-UP.

According to a fifth aspect, a communication method is provided, and includes: receiving, by a centralized unit control plane CU-CP entity of an access network, a configuration message from a network management system, where the configuration message comprises information about a network slice supported by a centralized unit user plane CU-UP entity of the access network; receiving, by the CU-CP, an interface setup request message from the CU-UP; and sending, by the CU-CP, an interface setup response message to the CU-UP, where the interface setup response message comprises the information about the network slice supported by the CU-UP.

In a possible design, the information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network.

In a possible design, the CU-CP sends, to a core network device, information about a network slice supported by the access network, and the network slice supported by the access network includes a network slice supported by both the CU-CP and the CU-UP.

In a possible design, the method further includes: sending, by the CU-CP, a load request message to the CU-UP, where the load request message is used to request to obtain load information of the network slice supported by the CU-UP. Further, optionally, an identifier of the network slice supported by the CU-UP is carried in the load request message.

In a possible design, information about a distributed unit that is of the access network and that is connected to the CU-UP is further carried in the interface setup request message.

According to a sixth aspect, a communication method is provided, and includes: sending, by a centralized unit user plane CU-UP entity of an access network, an interface setup request message to a centralized unit control plane CU-CP entity of the access network; and receiving, by the CU-UP, an interface setup response message from the CU-CP, where the interface setup response message comprises information about a network slice supported by the CU-UP.

In a possible design, the information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network.

In a possible design, the method further includes: receiving, by the CU-UP, a configuration message from a network management system, where the configuration message comprises the information about the network slice supported by the CU-UP.

In a possible design, the method further includes: receiving, by the CU-UP, a load request message from the CU-CP, where the load request message is used to request to obtain load information of the network slice supported by the CU-UP. Further, optionally, an identifier of the network slice supported by the CU-UP is carried in the load request message.

In a possible design, information about a distributed unit that is of the access network and that is connected to the CU-UP is further carried in the interface setup request message.

According to a seventh aspect, a communication method is provided, and includes: receiving, by a centralized unit CU of an access network, an interface setup request message from a distributed unit DU of the access network, where the interface setup request message comprises identification information of an access network notification area to which a cell served by the DU belongs; and sending, by the CU, an interface setup response message to the DU.

In a possible design, the CU includes a CU control plane CU-CP entity and a CU user plane CU-UP entity. The receiving, by a CU, an interface setup request message from a DU includes: receiving, by the CU-CP, the interface setup request message from the DU.

In a possible design, information about the CU-UP connected to the DU is further carried in the interface setup request message.

In a possible design, capacity information of the network slice supported by the DU is further carried in the interface setup request message.

According to an eighth aspect, a communication method is provided, and includes: sending, by a distributed unit DU of an access network, an interface setup request message to a centralized unit CU of the access network, where the interface setup request message comprises identification information of an access network notification area to which a cell served by the DU belongs; and receiving, by the DU, an interface setup response message from the CU.

In a possible design, the sending, by a DU, an interface setup request message to a CU includes: sending, by the DU, the interface setup request message to a CU control plane CU-CP entity.

In a possible design, information about the CU-UP connected to the DU is further carried in the interface setup request message.

In a possible design, capacity information of the network slice supported by the DU is further carried in the interface setup request message.

According to a ninth aspect, a communication method is provided, and includes: sending, by a centralized unit CU of an access network, a user equipment UE context release command message to a distributed unit DU of the access network; and receiving, by the CU, a UE context release complete message sent by the DU, where a context of the UE on the DU is carried in the context release complete message.

In a possible design, indication information is carried in the UE context release command message, and the indication information is used to indicate that the CU needs to set the UE from a connected state to an inactive state.

In a possible design, indication information is carried in the UE context release command message, and the indication information is used to indicate that the CU needs the context of the UE on the DU.

In a possible design, the context of the UE on the DU includes at least one of the following: identification information corresponding to a bearer set up by the DU for the UE, logical channel configuration information of the bearer, logical channel identification information of the bearer, RLC layer configuration information, MAC layer configuration information, and PHY layer configuration information of the bearer, C-RNTI identification information of the UE, and information about a cell accessed by the UE on the DU or information about a cell accessible by the UE on the DU.

According to a tenth aspect, a communication method is provided, and includes: receiving, by a distributed unit DU of an access network, a user equipment UE context release command message from a centralized unit CU of the access network; and sending, by the DU, a UE context release complete message, where a context of the UE on the DU is carried in the context release complete message.

In a possible design, indication information is carried in the UE context release command message, and the indication information is used to indicate that the CU needs to set the UE from a connected state to an inactive state.

In a possible design, indication information is carried in the UE context release command message, and the indication information is used to indicate that the CU needs the context of the UE on the DU.

In a possible design, the context of the UE on the DU includes at least one of the following: identification information corresponding to a bearer set up by the DU for the UE, logical channel configuration information of the bearer, logical channel identification information of the bearer, RLC layer configuration information, MAC layer configuration information, and PHY layer configuration information of the bearer, C-RNTI identification information of the UE, and information about a cell accessed by the UE on the DU or information about a cell accessible by the UE on the DU.

According to another aspect, a communications device is provided. The communications device may implement a function performed by the CU-CP in the method according to the fifth aspect, a function performed by the CU-UP in the method according to the sixth aspect, a function performed by the CU in the method according to the seventh aspect or the ninth aspect, or a function performed by the DU in the method according to the eighth aspect or the tenth aspect. The communications device includes one or more corresponding units or modules for performing the steps in the method according to any one of the fifth aspect to the tenth aspect. In other words, one step may be performed by one unit or module. In some cases, units or modules for performing two steps may be alternatively combined. For example, two sending steps may be performed by a same unit or module. The function may be implemented by using hardware, or may be implemented by hardware executing corresponding software.

According to another aspect, a communications device is provided. The communications device may implement a function performed by the CU-CP in the method according to the first aspect or the fifth aspect, a function performed by the CU-UP in the method according to the second aspect or the sixth aspect, a function performed by the CU in the method according to the seventh aspect or the ninth aspect, or a function performed by the DU in the method according to the eighth aspect or the tenth aspect. The communications device includes a processor and a communications interface. The communications interface is connected to the processor, to perform an operation of the CU-CP, the CU-UP, the CU, or the DU in the methods in the foregoing aspects. Specifically, the communications interface may perform a sending and/or receiving operation.

In a possible design, the communications device includes a memory. The memory stores an instruction, and the instruction is executed by the processor. When the instruction is being executed by the processor, the communications interface is controlled to perform the operation of the CU-CP, the CU-UP, the CU, or the DU in the methods in the foregoing aspects.

According to another aspect, a chip is provided. The chip includes a processor and an interface circuit. The interface circuit is configured to exchange information with an external device, and the interface circuit is connected to the processor, to perform the operation of the CU-CP, the CU-UP, the CU, or the DU in the methods in the foregoing aspects. Specifically, the interface circuit may perform a sending and/or receiving operation.

In a possible design, the chip includes a memory. The memory stores an instruction, and the instruction is executed by the processor. When the instruction is being executed by the processor, the interface circuit is controlled to perform the operation of the CU-CP, the CU-UP, the CU, or the DU in the methods in the foregoing aspects.

According to another aspect, an embodiment of this application provides a computer-readable storage medium. The computer-readable storage medium stores an instruction, and when the instruction is run on a computer, the computer is enabled to perform the methods in the foregoing aspects.

According to another aspect, an embodiment of this application provides a computer program product including an instruction. When the computer program product is run on a computer, the computer is enabled to perform the methods in the foregoing aspects.

DESCRIPTION OF EMBODIMENTS

Network architectures and service scenarios described in this application are intended to describe technical solutions in this application clearly, but are not intended to limit the technical solutions provided in this application. A person of ordinary skill in the art may know that as the network architectures evolve and a new service scenario emerges, the technical solutions provided in this application are also applicable to a similar technical problem.

It should be understood that the character "/" in this application indicates an "or" relationship between associated objects.

Figure 1:
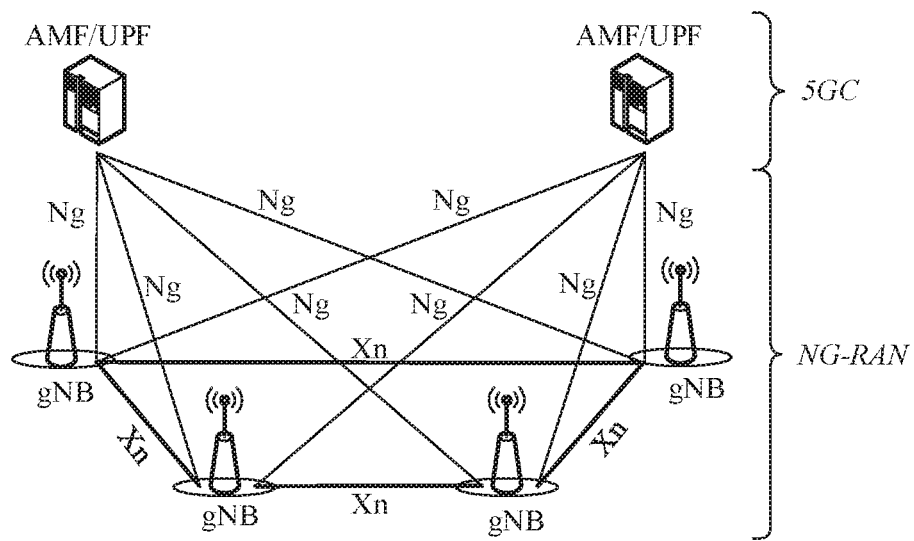
FIG. 1 is a schematic diagram of a network architecture of a communications system.

FIG. 1 is a schematic diagram of a network architecture of a communications system. The communications system includes an access network and a core network. The access network may be a next generation radio access network (Next Generation Radio Access Network, NG-RAN), and the core network may be a 5G core network (5G Core Network, 5GC). The access network may include a base station (for example, a gNB), and gNBs are connected through an interface (for example, an Xn interface). A gNB is connected to the 5GC through an interface (for example, an Ng interface). The core network may include an access and mobility management function (Access and Mobility management Function, AMF). The core network may further include a user plane function (User Plane Function, UPF).

Figure 2:
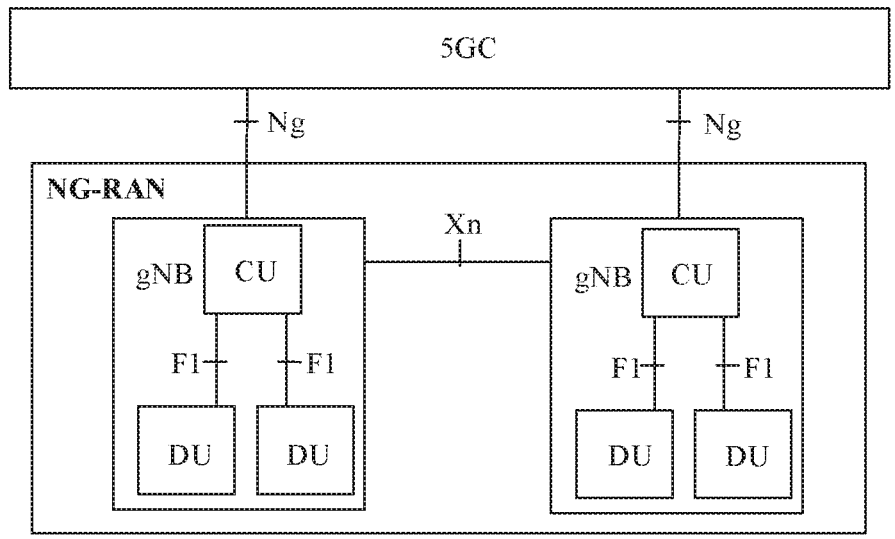
FIG. 2 is a schematic architectural diagram of a CU-DU used in a communications system.

FIG. 2 is a schematic architectural diagram of a CU-DU used in a communications system. As shown in FIG. 2, a base station may include a centralized unit (Centralized Unit, CU) and a distributed unit (Distributed Unit, DU).

Functions of the base station are divided. Some functions of the base station are deployed on the CU, and other functions of the base station are deployed on the DU. There may be one or more DUs. A plurality of DUs may share one CU, to save costs and facilitate network extension. The CU and the DU are connected through an interface (for example, an F1 interface). The CU is connected to a core network through an interface (for example, an Ng interface). Functions of the CU and the DU may be divided based on a protocol stack. In a possible manner, a radio resource control (radio resource control, RRC) and packet data convergence protocol (packet data convergence protocol, PDCP) layer, and a service data adaptation (Service Data Adaptation Protocol, SDAP) layer are deployed on the CU. A radio link control (Radio Link Control, RLC) protocol, media access control (Media Access Control, MAC), and a physical layer (physical layer, PHY) are deployed on the DU. Correspondingly, the CU is capable of processing the RRC, the PDCP, and the SDAP. The DU is capable of processing the RLC, the MAC, and the PHY. It should be noted that the foregoing function division is only an example, and there may be alternatively another division manner. For example, the CU is capable of processing the RRC, the PDCP, the RLC, and the SDAP, and the DU is capable of processing the MAC, and the PHY. For another example, the CU is capable of processing the RRC, the PDCP, the RLC, the SDAP, and a part of the MAC (for example, adding a MAC header), and the DU is capable of processing the PHY and a part of the MAC (for example, scheduling). Names of the CU and the DU may change, and any access network node that can implement the foregoing functions may be considered as the CU and the DU in this application.

Figure 3:
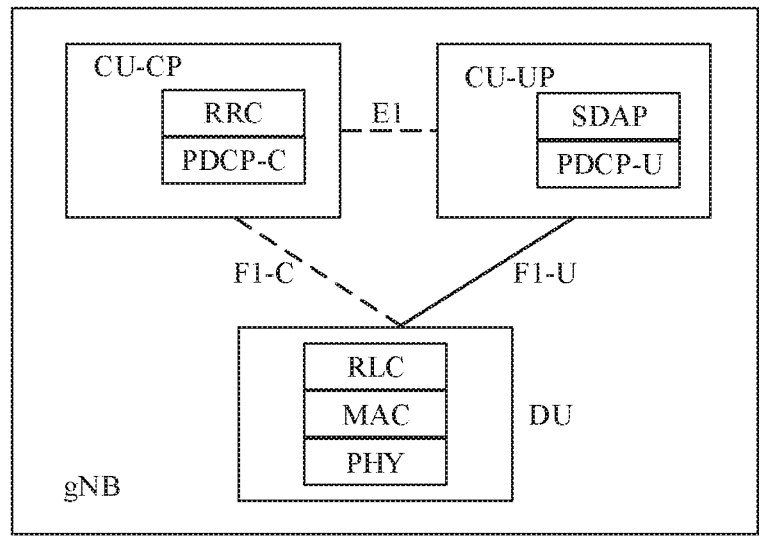
FIG. 3 is a schematic architectural diagram of a CU.

FIG. 3 is a schematic architectural diagram of a CU. As shown in FIG. 3, the CU includes a control plane CU (CU-CP) and a user plane CU (CU-UP). The CU-CP and the CU-UP can be deployed on different physical devices. Alternatively, the CU-CP and the CU-UP can be deployed on a same physical device. The CU-CP and the CU-UP are connected through an interface (for example, an E1 interface). The CU-CP indicates that a base station is connected to a core network through an interface (for example, an Ng interface). The CU-CP is connected to the DU through an interface (for example, an F1-C interface), and the CU-UP is connected to the DU through an interface (for example, an F1-U interface). There may be one CU-CP, and there may be one or more CU-UPs. A plurality of CU-UPs may share one CU-CP. The CU-CP mainly has a control plane function. The CU-UP mainly has a user plane function. In a possible implementation, for a 5G base station, an RRC layer may be deployed on the CU-CP, but a SDAP layer is not deployed on the CU-CP. The CU-CP may further have a control plane function of a PDCP layer. For example, the CU-CP may process a signaling radio bearer (signaling radio bearer, SRB). The SDAP layer may be deployed on the CU-UP, but the RRC layer is not deployed on the CU-UP. The CU-UP may further have a user plane function of the PDCP layer, for example, processing a data radio bearer (DRB).

Figure 4:
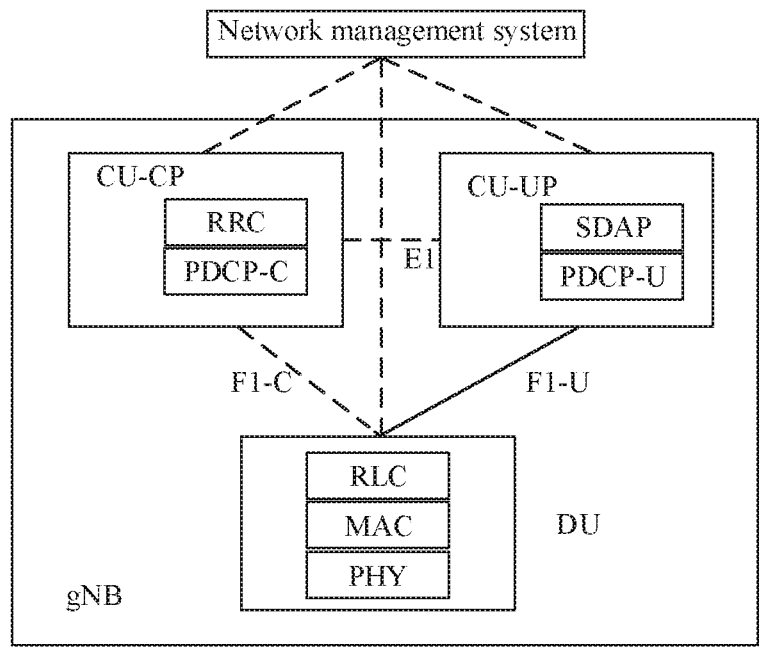
FIG. 4 is a schematic diagram of a network architecture of another communications system.

FIG. 4 is a schematic diagram of a network architecture of another communications system. The communications system includes a network management system and a base station. The network management system may be an operation, administration and maintenance (Operation Administration and Maintenance, OAM) entity. The base station is of a CU-DU architecture. The CU may include a CU-CP and a CU-UP. For details, refer to descriptions in FIG. 2 and FIG. 3. The network management system is connected to the CU-CP, to perform network configuration on the CU-CP. The network management system is connected to a DU, to perform network configuration on the DU. The network management system is connected to the CU-UP, to perform network configuration on the CU-UP. In some cases, the network management system is not connected to the CU-UP. In this case, the network management system configures the CU-UP by using the CU-CP.

With development of communications technologies, a concept of a network slice (network slice, NS) is further proposed. Main types of the network slice include: an enhanced mobile broadband (enhanced mobile broadband, eMBB) service, a massive machine-type communications (massive machine type communication, mMTC) service, and an ultra-reliable and low-latency communications (ultra-reliable and low latency communications, URLLC) service. The eMBB is mainly targeted for terminals that have high requirements for a rate and mobility, such as mobile phones and multimedia devices. The mMTC is mainly targeted for Internet of Things devices that have requirements for a large scale, low mobility and a low rate. The URLLC mainly refers to a service or a device type with harsh requirements for latency and reliability, such as the Internet of Vehicles and security information. For example, a mobile phone user may access a network slice of an eMBB type, to perform downloading at a high speed or watch a 4K high-definition video. A sensor device may access a network slice of an mMTC type, to transmit a small data packet and update a system configuration. A user may simultaneously access one or more or all network slices, to meet a service requirement and achieve better user experience.

Figure 5:
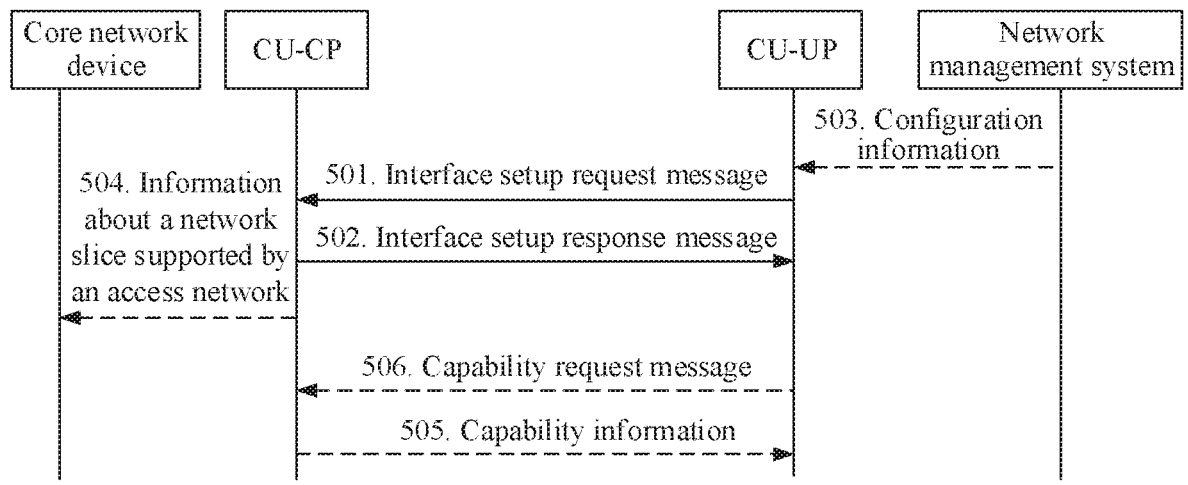
FIG. 5 is a schematic diagram of a communication method according to a first embodiment of the present invention.

FIG. 5 shows a communication method according to a first embodiment of the present invention. As shown in FIG. 5, the method includes the following steps.

501. A CU-UP sends an interface setup request message to a CU-CP, and the CU-CP receives the interface setup request message from the CU-UP. An interface requested to be set up in the interface setup request message may be an E1 interface.

The interface setup request message comprises information about a network slice supported by the CU-UP. The information about the network slice supported by the CU-UP may be an identifier of the network slice supported by the CU-UP. The identifier of the network slice may be single network slice selection assistance information (single-network slice selection assistance information, S-NSSAI). The identifier of the network slice may be alternatively an S-NSSAI list (S-NSSAI list).

The network slice may be partially deployed on a network. For example, some base stations support some types of network slices, and another base station supports other types of network slices. In a base station, a network slice supported by a CU and a network slice supported by a DU may be also different. In a CU, a network slice supported by a CU-CP and a network slice supported by a CU-UP may be also different. Sessions (for example, protocol data unit sessions, protocol data unit (PDU) sessions) or bearers belonging to different network slices are configured differently by an access network side. When setting up a session or a bearer for UE, a CU-CP selects a proper CU-UP as a serving node for the session or the bearer. If the CU-CP does not know a specific network slice supported by the CU-UP, the CU-CP may select a CU-UP that does not support the network slice corresponding to the session or the bearer. Consequently, session setup fails. In this embodiment, the CU-UP sends the interface setup request, so that the CU-CP obtains the network slice supported by the CU-UP. In this case, by considering the network slice, the CU-CP may select a proper CU-UP for a session or a bearer with reference to the network slice supported by the CU-UP, to avoid a session or bearer setup failure caused when the CU-UP does not support a network slice corresponding to the session or the bearer, avoid communication interruption, and ensure normal communication. In addition, the CU-UP sends the interface setup request, so that the CU-CP obtains the network slice supported by the CU-UP as soon as possible. It is not required that the CU-CP initiates, only when setting up a session or a bearer, obtaining the network slice supported by the CU-UP, thereby saving signaling overheads, avoiding latency, and further ensuring efficient and normal communication.

Optionally, the information about the network slice supported by the CU-UP includes an identity of a tracking area (tracking area, TA for short) served by the CU-UP and a network slice identifier corresponding to the tracking area. The identity of the TA may be represented by using a tracking area code (tracking area code, TAC) or a tracking area identity (tracking area identity/identifier, TAI). The TAI may include a TAC and a PLMN. Alternatively, the information about the network slice supported by the CU-UP includes an identity of a cell served by (cell list served by) the CU-UP and a network slice identifier corresponding to the cell. Alternatively, the information about the network slice supported by the CU-UP includes an identity of a public land mobile network (public land mobile network, PLMN) served by the CU-UP and a network slice identifier corresponding to the public land mobile network. Alternatively, the information about the network slice supported by the CU-UP includes an identity of a registration area (registration area, RA) served by the CU-UP and a network slice identifier corresponding to the public land mobile network. The identity of the RA may be represented by using a registration area code (registration area code, RAC) or a registration area identity (registration area identity/identifier, RAI). Alternatively, the information about the network slice supported by the CU-UP includes an identity of a cell served by the CU-UP (cell list served by CU-UP) and a network slice identifier corresponding to a TAI to which the cell belongs. Table 1 to Table 7 provide seven examples of information about the network slice supported by the CU-UP.

TABLE 1

| Information about a network slice supported by a CU-UP | S-NSSAI list (S-NSSAI list) or S-NSSAI |
| --- | --- |

TABLE 2

| Information element (IE) | Description |
| --- | --- |
| Tracking area identity | Tracking area identity (tracking area identity/identifier. TAI), and tracking area code (tracking area code, TAC) |
| Information about a network slice supported by each tracking area | For example, an S-NSSAI list (S-NSSAI list) or S-NSSAI |

TABLE 3

| IE | Description |
| --- | --- |
| Registration area identity | Registration area identity registration area identity/identifier, RAI), or registration area code (registration area code, RAC) |
| Information about a network slice supported by each registration area | For example, an S-NSSAI list (S-NSSAI list) or S-NSSAI |

TABLE 4

| IE | Description |
| --- | --- |
| Information about a network slice supported by a CU-UP >Broadcast PLMN >>PLMN identity >>Network slice information | For example, an S-NSSAI list S-NSSAI list) or S-NSSAI |

TABLE 5

| IE | Description |
| --- | --- |
| Information about a network slice supported by a CU-UP >Tracking area code or registration area code | Tracking area code (tracking area code, TAC) or registration area code (registration area code, RAC) |
| >Broadcast PLMN >>PLMN identity >>Network slice information | For example, an S-NSSAI list (S-NSSAI list) or S-NSSAI |

TABLE 6

| IE | Description |
| --- | --- |
| Cell identity Information about a network slice supported by a CU-UP >Tracking area code or registration area code | Tracking area code (tracking area code, TAC) or registration area code (registration area code, RAC) |
| >Broadcast PLMN >>PLMN identity >>Network slice information | For example, an S-NSSAI list (S-NSSAI list) or S-NSSAI |

TABLE 7

| IE | Description |
| --- | --- |
| Cell identity Tracking area code or registration area code | Tracking area code (tracking area code, TAC) or registration area code (registration area code, RAC) |
| Broadcast PLMN >PLMN identity >Network slice information | For example, an S-NSSAI list (S-NSSAI list) or S-NSSAI |

The interface setup request message may further include capacity information of the CU-UP. The capacity information may be information about an available resource of the CU-UP and/or load information of the CU-UP, and/or information about a processing capability (processing capacity) of the CU-UP. The available resource includes at least one of the following: a computing resource, a software resource, a storage resource, or a port resource (such as a quantity of available ports). The load information may include at least one of the following: a current load and a load that the CU-UP can currently bear. The capacity information may be a scalar value. When a network side sets up a bearer or a session for a terminal, the CU-CP may select a proper CU-UP with reference to the capacity information. For example, a larger value corresponding to the capacity information of the CU-UP indicates a stronger processing capability of the CU-UP. In another same case (for example, a plurality of CU-UPs all support a network slice corresponding to a session or a bearer that needs to be set up), a CU-CP selects, as a serving CU-UP, a CU-UP whose capacity information corresponds to a larger value.

Optionally, the capacity information of the CU-UP may be indicated at a network slice granularity. That is, capacity information of the CU-UP for each network slice is fed back for the network slice. The capacity information of the CU-UP may be specifically capacity information of a network slice supported by the CU-UP. The capacity information of the network slice supported by the CU-UP is available resource information, and/or processing capability information, and/or load information on the CU-UP for the network slice supported by the CU-UP.

Resources of different network slices may be isolated from each other on the CU-UP, and may be notified more accurately at a network slice granularity. This avoids a situation in which an improper CU-UP is selected because a network slice is overloaded, even if an overall capability of the CU-UP is sufficient. For example, a CU-UP 1 supports a network slice 1 and a network slice 2, and the network slice 1 and the network slice 2 use isolated resources, where an overall available resource of the network slice 1 accounts for 20% of an overall available resource of the CU-UP, and an overall available resource of the network slice 2 accounts for 80% of the overall available resource of the CU-UP. It is assumed that a load of the network slice 1 is high (for example, a remaining resource accounts for 5% of the overall available resource of the CU-UP), and a load of the network slice 2 is low (for example, a remaining resource accounts for 75% of the overall available resource of the CU-UP). If the capacity information is not indicated at a slice granularity, the CU-CP considers that the CU-UP 1 is still in a low-load status. If a user requests to set up a session of the network slice 1, the CU-CP still selects the CU-UP 1 to serve the user, and consequently session rejection occurs, communication is interrupted, and communication quality is affected. However, this case can be avoided when the capacity information is indicated at a network slice granularity.

The capacity information of the CU-UP may be shown in Table 8.

TABLE 8

| IE | Description |
| --- | --- |
| CU-UP identification information | Used to identify a specific CU-UP by the CU-CP |
| Capacity information (list) | |
| >Network slice identifier | For example, an S-NSSAI list (S-NSSAI list) or S-NSSAI |
| >Capability information ( ) | May be a scalar value |

The CU-UP may alternatively feed back the capacity information of each network slice for each supported PLMN. For example, when different operators share an access network device, for a network slice supported by each PLMN, the CU-UP feeds back corresponding capacity information. An advantage of doing this is that if a PLMN resource is independent, a misjudgment of the CU-CP can be avoided. For specific examples, refer to Table 9 and Table 10.

TABLE 9

| IE | Description |
| --- | --- |
| CU-UP identification information | Used to identify a specific CU-UP by the CU-CP |
| Capacity information | |
| >Broadcast PLMN | |
| >>PLMN | |
| >>Network slice information | For example, an S-NSSAI list (S-NSSAI list) or S-NSSAI |
| >>Capacity information (Capability) | May be a scalar value |

TABLE 10

| IE | Description |
| --- | --- |
| CU-UP identification information | Used to identify a specific CU-UP by the CU-CP |
| Broadcast PLMN | |
| >PLMN identity | |
| >Network slice information | For example, an S-NSSAI list (S-NSSAI list) or S-NSSAI |
| >Capacity information (Capability) | May be a scalar value |

The CU-UP may alternatively feed back the capacity information of each network slice for each tracking area, that is feed back corresponding capacity information for a network slice supported by each tracking area. For specific examples refer to Table 11 and Table 12.

TABLE 11

| IE | Description |
| --- | --- |
| CU-UP identification information | Used to identify a specific CU-UP by the CU-CP |
| TAC | |
| Broadcast PLMN | |
| >PLMN identity | |
| >Network slice information | For example, an S-NSSAI list (S-NSSAI list) or S-NSSAI |
| >Capacity information (Capability) | May be a scalar value |

TABLE 12

| IE | Description |
| --- | --- |
| CU-UP identification information | Used to identify a specific CU-UP by the CU-CP |
| TAC | |
| Capacity information | |
| >Broadcast PLMN | |
| >>PLMN identity | |
| >>Network slice information | For example, an S-NSSAI list (S-NSSAI list) or S-NSSAI |
| >>Capacity information (Capability) | May be a scalar value |

Certainly, if a plurality of network slices share a resource, the foregoing capacity information may be capacity information of the CU-UP for the network slices that share the resource.

The capacity information of the CU-UP is carried in the interface setup request message, so that the CU-CP knows a capacity of the CU-UP. This facilitates selecting a proper CU-UP by the CU-CP for UE or a service, a PDU session, or a DRB requested by the UE. For example, when the UE requests to set up a new session, a RAN side (including a CU-CP, a CU-UP, and a DU) needs to set up a related session or bearer for the UE and allocate a resource to the session or bearer that needs to be set up. If the CU-CP is connected to a DU 1 and a DU 2, the CU-CP is further connected to a CU-UP 1 and a CU-UP 2. In addition, the DU 1 has an interface with each of the CU-UP 1 and the CU-UP 2, and the DU 2 has an interface with each of the CU-UP 1 and the CU-UP 2. The CU-CP needs to select the CU-UP 1 or the CU-UP 2 to set up a session or bearer for the UE. In a selection manner, the CU-CP determines whether the CU-UP 1 and the CU-UP 2 support the network slice corresponding to the session or the bearer that needs to be set up. If both the CU-UP 1 and the CU-UP 2 support the network slice, the CU-CP further selects a CU-UP with a stronger capability (for example, the CU-UP 1) from the CU-UP 1 and the CU-UP 2 to set up the session or the bearer for the UE. In this way, load among CU-UPs is more balanced, thereby increasing resource utilization of a network, and also avoiding a session setup failure caused by selecting a CU-UP with an insufficient capability.

The interface setup request message further comprises service range information of the CU-UP. The service range information includes at least one of the following: the identity of the cell served by the CU-UP, the identity of the tracking area served by the CU-UP, an identity of a distributed unit DU connected to the CU-UP, or the identity of the public land mobile network served by the CU-UP. The identity that is of the cell served by the CU-UP and that is included in the service range information may be a cell identity or a cell identity list, and indicates that the CU-UP may set up bearers for terminals in these cells. The identity that is of the distributed unit DU connected to the CU-UP and that is included in the service range information may be a DU identity or a DU identity list, and indicates that the CU-UP may set up bearers for terminals in these DUs. The CU-UP has data plane interfaces with these DUs. The range information may be alternatively a PLMN identity, and indicates that the CU-UP may set up bearers for terminals in these PLMNs. The range information may be alternatively a tracking area identity (TAC identity or TAI identity), and indicates that the CU-UP may set up bearers for terminals in these tracking areas. Certainly, the range information may be alternatively a combination of the foregoing identities, for example, a PLMN identity+cell (cell) identity, and indicate that the CU-UP may set up bearers for and serve terminals that are within coverage of the cell and that access the PLMN. Certainly, the range information may be alternatively in another form, such as a TAC identity+PLMN identity+cell identity. The information may help the CU-CP select the proper CU-UP to serve UE and ensure normal communication. For example, the UE is being served by a cell 1 (for example, the UE is setting up an RRC connection to the cell 1 or has already set up a connection to the cell 1). If the UE needs to set up a session or a bearer, the CU-CP needs to select a CU-UP whose service range includes the cell 1. If the CU-CP does not select the CU-UP whose service range includes the cell 1, a session setup failure occurs.

502. The CU-CP sends an interface setup response message to the CU-UP, where the interface setup response message is a response to the interface setup request message.

Optionally, information about a network slice supported by the CU-CP is carried in the interface setup response message. The information about the network slice supported by the CU-CP may be an identifier of the network slice supported by the CU-CP. The identifier of the network slice may be S-NSSAI or an S-NSSAI list. In a case, the information about the network slice supported by the CU-CP includes an identity of a tracking area served by the CU-CP and a network slice identifier corresponding to the tracking area. Alternatively, the information about the network slice supported by the CU-CP includes an identity of a cell served by the CU-CP and a network slice identifier corresponding to the cell. Alternatively, the information about the network slice supported by the CU-CP includes an identity of a public land mobile network served by the CU-CP and a network slice identifier corresponding to the public land mobile network.

Capacity information of the CU-CP is further carried in the interface setup response message. Optionally, the capacity information of the CU-CP may be indicated at a network slice granularity.

Before step 501, the communication method may further include step 503: A network management system sends configuration information to the CU-UP, and the CU-UP receives the configuration information from the network management system. The information about the network slice supported by the CU-UP is carried in the configuration information. The network management system may be OAM.

When notifying a core network (for example, an AMF) of a network slice supported by a RAN, the CU-CP may alternatively consider a network slice supported by both the CU-CP and the CU-UP. Optionally, after step 502, the communication method may further include step 504: The CU-CP sends, to a core network device, information about a network slice supported by an access network. The network slice supported by the access network includes a network slice supported by both the CU-CP and the CU-UP. That is, an intersection set of network slices supported by the CU-CP and network slices supported by the CU-UP. The CU-CP may send, by using the interface setup request message or a configuration update request message, the information about the network slice supported by the access network to the core network device. The information about the network slice supported by the access network is carried in the interface setup request message or the configuration update request message.

Optionally, in the embodiment shown in FIG. 5, the capacity information may be alternatively sent by using dedicated signaling. As shown in FIG. 5, the communication method may further include step 505: The CU-UP sends capacity information to the CU-CP, and the CU-CP receives the capacity information from the CU-UP. For the capacity information of the CU-UP, refer to the foregoing description. The capacity information of the CU-UP may be the capacity information of the network slice supported by the CU-UP. Before step 504, the communication method may further include step 506: The CU-CP sends a capacity request message to the CU-UP, and the CU-UP receives the capacity request message from the CU-CP. In this way, the CU-CP may obtain the capacity information of the CU-UP in real time based on a requirement.

The embodiment shown in FIG. 5 may be alternatively extended to a configuration update process. Correspondingly, the interface setup request message in step 501 needs to be changed to a configuration update request message. The configuration update request message may be a CU-UP configuration update request message. The interface setup response message in step 502 needs to be changed to a configuration update response message. The configuration update response message may be a CU-UP configuration update response message. For content carried in the configuration update request message, refer to the content carried in the foregoing interface setup request message. For content carried in the configuration update response message, refer to the content carried in the foregoing interface setup response message.

Figure 6:
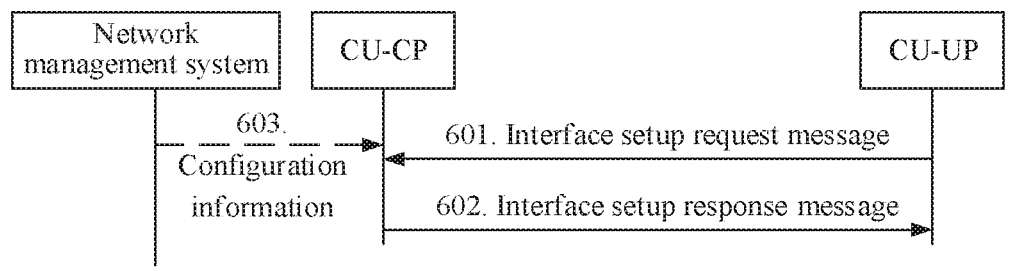
FIG. 6 is a schematic diagram of a communication method according to a second embodiment of the present invention.

FIG. 6 shows a communication method according to a second embodiment of the present invention. As shown in FIG. 6, the method includes the following steps:

601. A CU-UP sends an interface setup request message to a CU-CP, and the CU-CP receives the interface setup request message from the CU-UP. An interface requested to be set up in the interface setup request message may be an E1 interface.

In step 601, the interface setup request message may include capacity information of the CU-UP. For the capacity information of the CU-UP, refer to the foregoing description.

Before step 601, the communication method may further include step 603: A network management system OAM sends configuration information to the CU-CP, and the CU-CP receives the configuration information from the network management system. Information about a network slice supported by the CU-UP is carried in the configuration information.

602. The CU-CP sends an interface setup response message to the CU-UP.

Optionally, in step 602, capacity information of the CU-CP may be carried in the interface setup response message.

The communication method may further include step 603: The network management system sends the configuration information to the CU-CP, and the CU-CP receives the configuration information from the network management system. Information about a network slice supported by the CU-UP is carried in the configuration information. For the information about the network slice supported by the CU-UP, refer to the foregoing description.

When step 603 is performed, the information about the network slice supported by the CU-UP may be carried in the interface setup response message in step 602.

In this embodiment, after step 602, step 504, step 505, and step 506 in the embodiment shown in FIG. 5 may be alternatively performed based on a requirement.

The embodiment shown in FIG. 6 may be alternatively extended to a configuration update process. Correspondingly, the interface setup request message in step 601 needs to be changed to a configuration update request message. The configuration update request message may be a CU-UP configuration update request message. The interface setup response message in step 602 needs to be changed to a configuration update response message. The configuration update response message may be a CU-UP configuration update response message. For content carried in the configuration update request message, refer to the content carried in the foregoing interface setup request message. For content carried in the configuration update response message, refer to the content carried in the foregoing interface setup response message.

Figure 7:
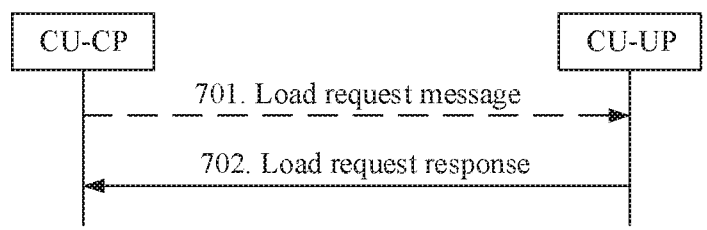
FIG. 7 is a schematic diagram of a communication method according to a third embodiment of the present invention.

FIG. 7 shows a communication method according to a third embodiment of the present invention. As shown in FIG. 7, the method includes the following steps:

701. A CU-CP sends a load request message to a CU-UP, and the CU-UP receives the load request message from the CU-CP. The load request message is used to request to obtain load information of a network slice supported by the CU-UP.

Optionally, information about a network slice may be carried in the load request message, for example, a network slice identifier, to indicate that the CU-CP expects to obtain a load status of the network slice on the CU-UP. Certainly, if the CU-CP expects to obtain load statuses of a plurality of network slices, a list of network slice identifiers may be carried.

702. The CU-UP sends a load request response to the CU-CP, and the CU-CP receives the load request response from the CU-UP. The load request response may carry the load status of the network slice on the CU-UP, for example, a load status of a network slice supported in each cell served by the CU-UP. For specific information carried in the load request response, refer to Table 13 and Table 14.

TABLE 13

| IE | Description |
| --- | --- |
| Cell information >Cell information item >>Cell identity >>Load information corresponding to a network slice >>>Information about a network slice identifier >>>Load indication information | For example, an S-NSSAI list (S-NSSAI list) or S-NSSAI May be a scalar value |

TABLE 14

| IE | Description |
| --- | --- |
| Cell information >Cell information item >>Cell identity >>Information about a network slice identifier >>Load indication information | For example, an S-NSSAI list (S-NSSAI list) or S-NSSAI May be a scalar value |

A load status of a network slice supported and served by the CU-UP (regardless of cells) may be further carried in the load request response, and an example is shown in Table 15.

TABLE 15

| IE | Description |
| --- | --- |
| CU-UP identification information | Used to identify a specific CU-UP by the CU-CP |
| Load information (list) >Network slice identifier | For example, an S-NSSAI list (S-NSSAI list) or S-NSSAI |
| >Load indication information | May be a scalar value |

The CU-UP may alternatively feed back load information of each network slice for each supported PLMN. For example, when different operators share an access network device, for a network slice supported by each PLMN, the CU-UP feeds back corresponding load information. An advantage of doing this is that if a PLMN resource is independent, a misjudgment of the CU-CP can be avoided. For specific examples, refer to Table 16 and Table 17.

TABLE 16

| IE | Description |
| --- | --- |
| CU-UP identification information | Used to identify a specific CU-UP by the CU-CP |
| Load information >Broadcast PLMN >>PLMN identity | |

TABLE 16-continued

| IE | Description |
| --- | --- |
| >>Network slice information | For example, an S-NSSAI list (S-NSSAI list) or S-NSSAI |
| >>Load indication information | May be a scalar value |

TABLE 17

| IE | Description |
| --- | --- |
| CU-UP identification information | Used to identify a specific CU-UP by the CU-CP |
| Broadcast PLMN | |
| >PLMN identity | |
| >Network slice information | For example, an S-NSSAI list (S-NSSAI list) or S-NSSAI |
| >Load indication information | May be a scalar value |

The CU-UP may alternatively feed back the load information of each network slice for each tracking area, that is, feed back corresponding load information for a network slice supported by each tracking area. For specific examples, refer to Table 18 and Table 19.

TABLE 18

| IE | Description |
| --- | --- |
| CU-UP identification information | Used to identify a specific CU-UP by the CU-CP |
| TAC | |
| Broadcast PLMN | |
| >PLMN identity | |
| >Network slice information | For example, an S-NSSAI list (S-NSSAI list) or S-NSSAI |
| >Load indication information | May be a scalar value |

TABLE 19

| IE | Description |
| --- | --- |
| CU-UP identification information | Used to identify a specific CU-UP by the CU-CP |
| TAC | |
| Load information | |
| >Broadcast PLMN | |
| >>PLMN identity | |
| >>Network slice information | For example, an S-NSSAI list (S-NSSAI list) or S-NSSAI |
| >>Load indication information | May be a scalar value |

Certainly, if a plurality of network slices share a resource, the foregoing capacity information may be information about load of the CU-UP for the network slice that share the resource.

The embodiment shown in FIG. 7 may exist independently, or may be combined with the foregoing embodiments. For example, the embodiment shown in FIG. 7 is performed after step 502 in the embodiment shown in FIG. 5 or step 602 in the embodiment shown in FIG. 6.

Figure 8:
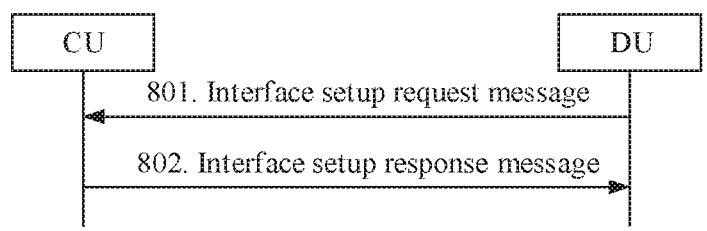
FIG. 8 is a schematic diagram of a communication method according to a fourth embodiment of the present invention.

FIG. 8 shows a communication method according to a fourth embodiment of the present invention. As shown in FIG. 8, the method includes the following steps.

801. A DU sends an interface setup request message to a CU, and the CU receives the interface setup request message from the DU. An interface requested to be set up in the interface setup request message may be an F1 interface.

Identification information of an access network notification area (RAN Notification Area, RNA) to which a cell served by the DU belongs may be carried in the interface setup request message. The RNA identification information may be an RNA code (RNA Code). The RNA code may be a group of codes similar to a TAC. Alternatively, the RNA identification information may be alternatively an RNA identity (RNA Identifier/Identity, RNA ID). For example, the RNA ID may be represented in a form of RNAC+PLMN. Namely, the RNA ID may represent both an RNAC and a PLMN of a cell. Alternatively, the RNA ID may be represented in a form of RNAC+TAI. Namely, the RNA ID may represent both the RNAC and a TAI of the cell. Certainly, the RNA identification information may be alternatively expressed in another manner.

The RNA identification information may be used to uniquely identify an RNA to which a cell belongs within a specific range. The cell may notify, by broadcasting the RNA identification information, a terminal of the RNA identification information to which the cell belongs. A plurality of cells may broadcast same RNA identification information, or may broadcast different RNA identification information. If the plurality of cells broadcast the same RNA identification information, these cells belong to a same RNA. If the plurality of cells broadcast different RNA identification information, these cells belong to different RNAs. The RNA identification information herein may also be referred to as identification information of a radio access network paging area (RAN paging area, RPA).

The RNA may include one or more cells. If the RNA includes a plurality of cells, the plurality of cells may belong to one network device, or may belong to different network devices. The different network devices may be network devices of a same radio access technology (radio access technology, RAT), or may be network devices of different RATs. For example, the network devices may be eNBs in a 4.5G network, or may be gNBs in a 5G network. When moving within the RNA, a terminal in an inactive state may not notify a network. Instead, the terminal only reselects a cell based on mobility of the terminal and periodically updates the RNA. When the terminal in the inactive state moves to a cell outside the RNA, the terminal needs to notify the network and updates the RNA. RNA update is similar to tracking area update (Tracking Area Update, TAU) in a long term evolution (Long Term Evolution, LTE) network.

An inactive state, also referred to as a radio resource control (radio resource control, RRC) inactive state, is a communication state newly defined in 5G The communication state may be understood as an independent communication state, that is, an independent state other than an RRC connected (Connected/Active) state and an RRC idle (Idle) state, or may be understood as a communication substrate of a connected state or an idle mode. The terminal in the inactive state may have at least one of the following features: A. Context information of the terminal in an access stratum (Access Stratum, AS) is reserved on both a terminal side and a radio access network (radio access network, RAN) side. B. When the terminal changes from the inactive state to the RRC connected state, a link between a network device and a control plane network element of a core network does not need to be reactivated. For example, a link between a base station side and a core network side does not need to be reactivated. C. The mobility of the terminal is implemented through cell reselection instead of handover.

In a CU-DU architecture, if the CU determines to set a connected (Connected) state of a user to an inactivated (Inactive) state, the CU allocates an RNA to the user. If the CU does not know the RNA ID of the cell served by the DU, the CU may indicate an RNA area allocated to the user only by configuring the RNA as a cell identity list, that is, by using the cell identity list. In this case, overheads of air interface resources occur. One RNA area may relate to a plurality of cells. More related cells indicate higher air interface overheads. In this application, the CU obtains, by using the interface setup request, the RNA ID of the cell served by the DU. In this case, the CU may configure the RNA area in a form of an RNA ID (or a RAN ID list). Because the plurality of cells may share one RNA ID, using the RNA ID can reduce more overheads of air interface signaling than using the cell identity list does. The CU obtains the RNA ID of the cell served by the DU, and may allocate the RNA ID (list) to the terminal.

A form in which RNA information is carried in the interface setup request message may be shown in Table 20. In Table 20, the RNA information is an RNA served by the DU, and is not distinguished by cell granularity.

TABLE 20

| IE | Description |
| --- | --- |
| Message type | Message type |
| CU-CP ID | The CU-CP identifier may be used to uniquely identify a CU-CP within an access network or within another range |
| RPAC or RPAI (list) | RPA information corresponding to the base station |

The form in which the RNA information is carried in the interface setup request message may be shown in Table 21, Table 22, or Table 23. In Table 21, Table 22, or Table 23, the RNA information is distinguished by cell granularity.

TABLE 21

| IE | Description |
| --- | --- |
| Cell ID | The cell identity may be a PCI, or may be a CGI or another identifier |
| RPAC | RPA code |
| Broadcast PLMNs | Broadcast PLMN list |
| >PLMN identity | PLMN identity |

TABLE 22

| IE | Description |
| --- | --- |
| Cell ID | The cell identity may be a PCI, or may be a CGI or another identifier |
| Broadcast PLMNs | Broadcast PLMN list |
| >PLMN identity | PLMN identity |
| >RPAC or RPA ID (list) | RPA code or RPA identity/identifier |

TABLE 23

| IE | Description |
| --- | --- |
| Cell ID | The cell identity may be a PCI, or may be a CGI or another identifier |
| Broadcast PLMNs | Broadcast PLMN list |
| TAC | Tracking area code |
| >PLMN identity | PLMN identity |
| >RPAC or RPA ID (list) | RPA code or RPA identity/identifier |

Optionally, capacity information of the DU may be carried in the interface setup request message. For the capacity information of the DU, refer to the foregoing description of the capacity information of the CU-UP. The capacity information may be information about an available resource of the DU and/or load information of the DU, and/or information about a processing capability (processing capacity) of the DU. Optionally, the capacity information of the DU may be indicated at a network slice granularity. That is, capacity information of the DU for each network slice is fed back for the network slice. The capacity information of the DU may be specifically capacity information of a network slice supported by the DU. The capacity information of the network slice supported by the DU is available resource information, and/or processing capability information, and/or load information of the DU for the network slice supported on the DU.

802. The CU sends an interface setup response message to the DU, and the DU receives the interface setup response message from the CU.

Optionally, capacity information of the CU may be carried in the interface setup response message. For the capacity information of the CU, refer to the foregoing description.

The CU can use a CU-CP and CU-UP architecture. That is, the CU includes a CU control plane entity CU-CP and a CU user plane entity CU-UP. In step 801, that the DU sends the interface setup request message to the CU specifically includes: The DU sends the interface setup request message to the CU-CP. Correspondingly, the interface requested to be set up in the interface setup request message may be an F1-C interface.

Optionally, identification information of a CU-UP connected to the DU may further be carried in the interface setup request message. The identification information of the CU-UP connected to the DU is carried in the interface setup request message sent to the CU-CP, so that the CU-CP obtains information about the CU-UP connected to the DU. In this way, the CU-CP selects a proper CU-UP to serve UE. For example, the UE gains access from a DU 1 or is being served by the DU 1 (for example, the UE is setting up an RRC connection to the DU 1 or has set up a connection to the DU 1). If the UE needs to set up a session or a bearer, the CU-CP needs to select a CU-UP that has an F1-U connection to the DU 1.

The embodiment shown in FIG. 8 may be alternatively extended to a configuration update process. Correspondingly, the interface setup request message in step 801 needs to be changed to a configuration update request message. The configuration update request message may be a DU configuration update request message. The interface setup response message in step 802 needs to be changed to a configuration update response message. The configuration update response message may be a DU configuration update response message.

Figure 9:
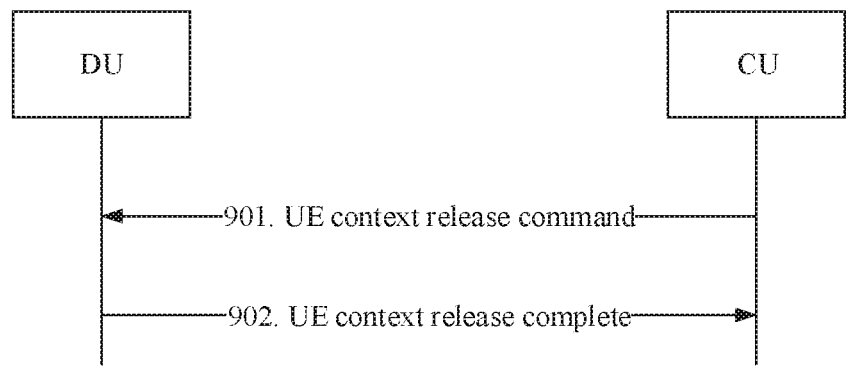
FIG. 9 is a schematic diagram of a communication method according to a fifth embodiment of the present invention.

FIG. 9 shows a communication method according to a fifth embodiment of the present invention. As shown in FIG. 9, the method includes the following steps:

901. A CU sends a user equipment context release command (UE context release command) message to a DU, and the DU receives the UE context release command message.

902. The CU receives a UE context release complete (UE context release complete) message sent by the DU, and the CU receives the UE context release complete message sent by the DU. A context of the UE on the DU is carried in the context release complete message.

Optionally, indication information is carried in the UE context release command message, and the indication information is used to indicate that the CU needs to set the UE from a connected state to a inactive state. The indication information may be cause (cause) information, or may be an information element (IE).

Optionally, indication information is carried in the UE context release command message, and the indication information is used to indicate that the CU needs the context of the UE on the DU. Specifically, the indication information may be used to indicate that before deleting the context of the UE, the DU sends, to the CU, the context of the UE on the DU. The indication information may be an information element (IE).

The context of the UE on the DU includes at least one of the following: identification information corresponding to a bearer set up by the DU for the UE, logical channel configuration information of the bearer, logical channel identification information of the bearer, RLC layer configuration information, MAC layer configuration information, and PHY layer configuration information of the bearer, identification information of a cell radio network temporary identifier (cell radio network temporary identifier, C-RNTI) of the UE, or information about a cell accessed by the UE on the DU or information about a cell accessible by the UE on the DU. The context may be in a form of a container, or may be in another form.

When the CU decides to change a connected state of UE to an inactive state, the CU needs to instruct a source DU on which the UE camps to release the context of the UE. However, for the terminal in the inactive state, when the UE needs to resume (resume) to the connected state, a new serving base station or a new serving DU obtains context information of the terminal from a source CU or a camped source base station. Examples are as follows:

(1) An inter-DU (inter-DU) and intra-CU (intra-CU) movement scenario. That is, inactive UE has moved from a camped source DU 1 to a new DU 2 (new serving DU), but the inactive UE does not move out of a serving area of a camped source CU 1. When the inactive UE expects to resume to a connected state, the CU 1 requests the DU 2 to set up a context for the UE, for example, setting up a configuration for a related bearer (DRB and/or SRB), allocate a resource, and serve the user. In this case, the CU needs to notify the DU 2 of previous context information of the DU 1 (for example, configuration information of the bearer), so that the DU 2 performs differentiated configuration based on the configuration.

(2) An inter-DU (inter-DU) and inter-CU (inter-CU) movement scenario. That is, the inactive UE has moved from the camped source DU 1 to the new DU 2, and moved from the camped source CU 1 to a new CU 2 (a new serving CU). When the inactive UE expects to resume to the connected state, the CU 2 and the DU 2 set up a context for the UE, for example, setting up a related bearer (DRB and/or SRB), and serve the user. In this case, the CU 2 requests, from the CU 1, previous context information (for example, configuration information of the bearer) including context information of the DU 1 and the CU 1, and needs to notify the DU 2 of previous configuration information of the DU 1, so that the DU 2 performs differentiated configuration based on the configuration.

(3) An inter-access network (inter-RAN) movement scenario. That is, the inactive UE has moved from the camped source DU 1 and CU 1 to a gNB 2, and the gNB 2 is not in a CU-DU architecture. When the inactive UE expects to resume to the connected state, the gNB 2 sets up a context for the UE, for example, setting up a related bearer (DRB and/or SRB), and serve the user. In this case, the gNB 2 requests, from the CU 1, previous context information (for example, configuration information of the bearer) including context information of the DU 1 and the CU 1, so that the gNB 2 performs differentiated configuration based on the configuration.

When the inactive state of the UE needs to be changed to the connected state, a new serving node needs to obtain context information of a camped source DU, but a camped source base station or DU has deleted a context related to the DU. Consequently, communication cannot be performed normally. In this application, the CU may obtain a context of the UE, and may store the context. In this way, an inactive user can obtain and use the context when another DU or base station resume to a connected state, thereby ensuring normal communication.

The foregoing mainly describes the solutions in the embodiments of this application from a perspective of interaction between communications devices. It may be understood that, to implement the foregoing functions, the communications devices include corresponding hardware structures and/or software modules for performing the various functions. A person skilled in the art should be easily aware that units and algorithms steps in the examples described with reference to the embodiments disclosed in this specification can be implemented in a form of hardware or a combination of hardware and computer software in this application. Whether a function is performed by hardware or hardware driven by computer software depends on specific application and a design constrained condition of the technical solutions. A person skilled in the art may use different methods to implement the described functions for each particular application, but it should not be considered that such implementation goes beyond the scope of this application.

In the embodiments of this application, the CU, the DU, the CU-CP, the CU-UP, or the like may be divided into function units based on the foregoing method examples. For example, the function units may be obtained through division based on corresponding functions, or two or more functions may be integrated into one function unit. The integrated unit may be implemented in a form of hardware, or may be implemented in a form of a software function unit. It should be noted that the unit division in the embodiments of this application is an example, and is merely logical function division. There may be another division manner during actual implementation.

Figure 10:
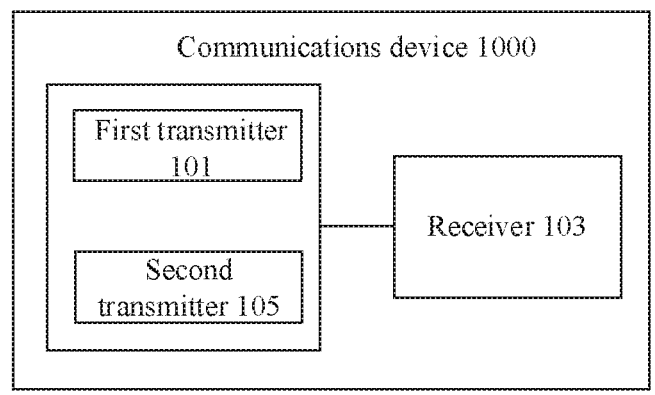
FIG. 10 is a schematic diagram of a communications device according to a sixth embodiment of the present invention.

FIG. 10 is a schematic diagram of a communications device according to a sixth embodiment of the present invention. FIG. 10 is a possible schematic structural diagram of the CU-CP in the foregoing embodiments. As shown in FIG. 10, the communications device 1000 is a centralized unit control plane CU-CP entity of an access network. The communications device 1000 includes a receiver 103, configured to receive an interface setup request message from a centralized unit user plane CU-UP entity of the access network. The interface setup request message comprises information about a network slice supported by the CU-UP. The communications device 1000 further includes a first transmitter 101, configured to send an interface setup response message to the CU-UP.

The information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network.

The interface setup request message further comprises capacity information of the network slice supported by the CU-UP.

The communications device further includes a second transmitter 105. The second transmitter 105 is configured to send, to a core network device, information about a network slice supported by the access network. The network slice supported by the access network includes a network slice supported by both the CU-CP and the CU-UP. In this application, the first transmitter 101 and the second transmitter 105 may be a same transmitter, or may be different transmitters.

The first transmitter 101 is further configured to send a load request message to the CU-UP. The load request message is used to request to obtain load information of the network slice supported by the CU-UP. Optionally, an identifier of the network slice supported by the CU-UP is carried in the load request message.

The interface setup request message further comprises service range information of the CU-UP. The service range information includes at least one of the following: the identity of the cell served by the CU-UP, the identity of the tracking area served by the CU-UP, an identity of a distributed unit DU connected to the CU-UP, or the identity of the public land mobile network served by the CU-UP.

Figure 11:
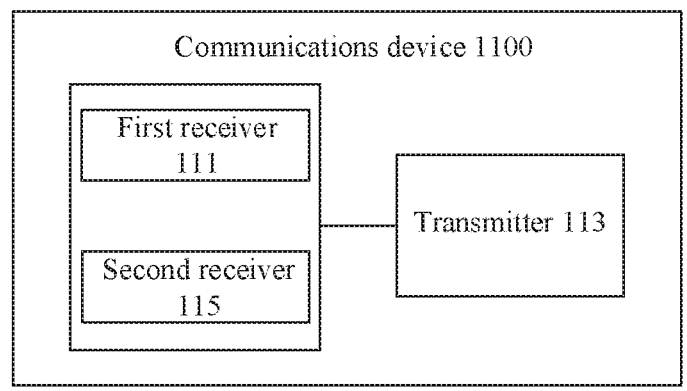
FIG. 11 is a schematic diagram of a communications device according to a seventh embodiment of the present invention.

FIG. 11 is a schematic diagram of a communications device according to a seventh embodiment of the present invention. FIG. 11 is a possible schematic structural diagram of the CU-UP in the foregoing embodiments. As shown in FIG. 11, the communications device 1100 is a centralized unit user plane CU-UP entity of an access network. The communications device 1100 includes a transmitter 113, configured to send an interface setup request message to a centralized unit control plane CU-CP entity of the access network. The interface setup request message comprises information about a network slice supported by the CU-UP. The communications device 1100 further includes a first receiver 111, configured to receive an interface setup response message from the CU-CP.

The information about the network slice supported by the CU-UP includes: an identity of a tracking area served by the CU-UP and a network slice identifier corresponding to the tracking area, an identity of a cell served by the CU-UP and a network slice identifier corresponding to the cell, or an identity of a public land mobile network served by the CU-UP and a network slice identifier corresponding to the public land mobile network.

The interface setup request message further comprises capacity information of the network slice supported by the CU-UP.

The communications device 1100 further includes a second receiver 115. The second receiver 115 is configured to receive a configuration message from a network management system, and the configuration message comprises the information about the network slice supported by the CU-UP. In this application, the first receiver 111 and the second receiver 115 may be a same transmitter, or may be different transmitters.

The first receiver 111 is further configured to receive a load request message from the CU-CP. The load request message is used to request to obtain load information of the network slice supported by the CU-UP. Further, optionally, an identifier of the network slice supported by the CU-UP is carried in the load request message.

The interface setup request message further comprises service range information of the CU-UP. The service range information includes at least one of the following: the identity of the cell served by the CU-UP, the identity of the tracking area served by the CU-UP, an identity of a distributed unit DU connected to the CU-UP, or the identity of the public land mobile network served by the CU-UP.

Figure 12:
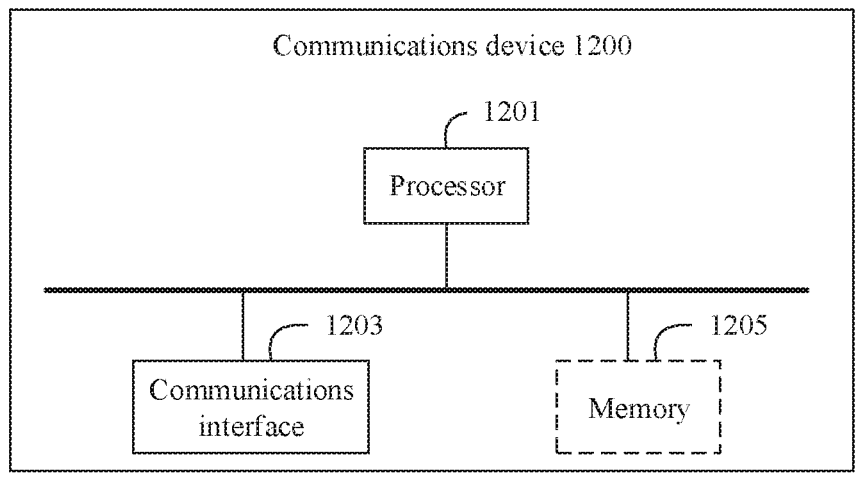
FIG. 12 is a schematic diagram of a communications device according to an eighth embodiment of the present invention.

FIG. 12 is a schematic diagram of a communications device according to an eighth embodiment of the present invention. As shown in FIG. 12, the communications device 1200 may perform an operation of the CU-CP, the CU-UP, the CU, or the DU in the method in any embodiment shown in FIG. 5 to FIG. 9. The communications device 1200 includes a processor and a communications interface 1203. The communications interface 1203 is connected to the processor, to perform the operation of the CU-CP, the CU-UP, the CU, or the DU in the methods in the foregoing aspects. Specifically, the communications interface 1203 may perform a sending and/or receiving operation.

Optionally, the communications device 1200 further includes a memory 1205. The memory 1205 stores an instruction, and the instruction is executed by the processor. When the instruction is being executed by the processor, the communications interface 1203 is controlled to perform the operation of the CU-CP, the CU-UP, the CU, or the DU in the methods in the foregoing aspects.

Figure 13:
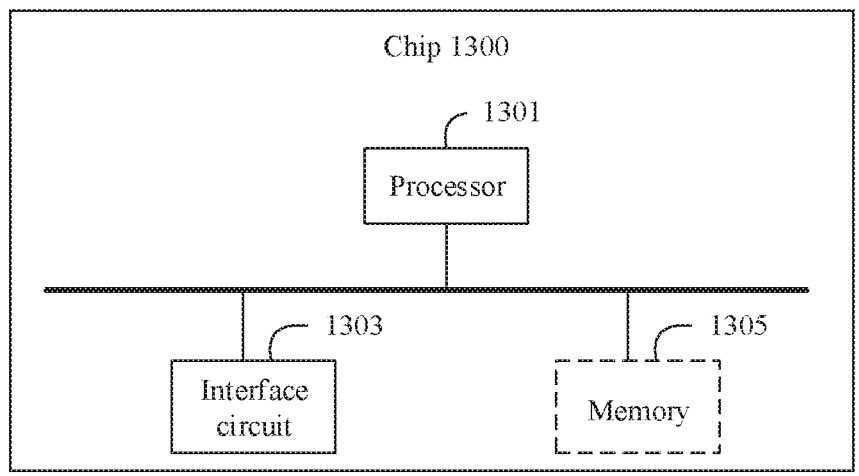
FIG. 13 is a schematic diagram of a chip according to a ninth embodiment of the present invention.

FIG. 13 is a schematic diagram of a chip according to a ninth embodiment of the present invention. As shown in FIG. 13, the chip 1300 includes a processor 1301 and an interface circuit 1303. The interface circuit 1303 is configured to exchange information with an external device, and the interface circuit 1303 is connected to the processor 1301, to perform an operation of the CU-CP, the CU-UP, the CU, or the DU in the method in any embodiment shown in FIG. 5 to FIG. 9. Specifically, the interface circuit 1303 may perform a sending and/or receiving operation. The chip 1300 may be a chip used in a communications device.

Optionally, the chip 1300 further includes a memory 1305. The memory 1305 stores an instruction, and the instruction is executed by the processor 1301. When the instruction is being executed by the processor 1301, the interface circuit 1303 is controlled to perform the operation of the CU-CP, the CU-UP, the CU, or the DU in the methods in the foregoing aspects.

In this application, information about a network slice may be represented by using at least one of the following parameters:

1. Network slice identifier. The network slice identifier may be specifically one or more pieces of the following listed information in 1.1 to 1.7:

1.1. Network slice type information. The network slice type information may be used to indicate network slice types such as an enhanced mobile broadband (enhanced mobile broadband, eMBB) service, ultra-reliable and low-latency communications (ultra-reliable low latency communications, URLLC), and massive machine-type communications (massive machine type communication, mMTC). Optionally, the network slice type information may further indicate an end-to-end network slice type including a network slice type from a RAN to a CN, or may alternatively indicate a network slice type on a (R)AN side, or a network slice type on a CN side.

1.2. Service type information, related to a specific service. The service type information may indicate a service feature such as a video service, an Internet of Vehicles service, or a voice service, or information about a specific service.

1.3. Tenant (tenant) information, used to indicate information about a customer who creates or rents the network slice. For example, the customer is Tencent or State Grid.

1.4. User group information, used to indicate group information for grouping users based on a feature such as a user level.

1.5. Slice group information, used to indicate that network slices may be grouped based on a feature. For example, all network slices that can be accessed by UE may be used as a slice group. Alternatively, the network slices may be grouped according to another criterion.

1.6. Network slice instance information, used to indicate an identifier and feature information of an instance created for the network slice. For example, an identifier indicating a network slice instance may be allocated to the network slice instance, or a new identifier associated with the network slice instance may be mapped based on a network slice instance identifier. A receiving side may identify, based on the identifier, a specific network slice instance indicated by the identifier.

1.7. Dedicated core network (dedicated core network, DCN) identifier. The identifier is used to uniquely indicate a dedicated core network in an LTE system or an eLTE system, for example, a dedicated core network in the Internet of Things. Optionally, mapping may be performed on the DCN identifier and a network slice identifier. To be specific, the DCN identifier may be mapped to the network slice identifier, and the network slice identifier may be mapped to the DCN identifier.

It should be understood that if a network side allows, within a registration area (registration area) or a tracking area (tracking area) to which a source cell belongs, the UE to access a plurality of network slices, or for a public land mobile network PLMN (public land mobile network, PLMN), the network side allows, in the registration area or the tracking area to which the source cell belongs, the UE to access a plurality of network slices, an indication of an allowed network slice includes a plurality of allowed (allowed) network slice identifiers.

2. Single network slice selection assistance information (single-network slice selection assistance information, S-NSSAI). The S-NSSAI includes at least slice type/service type (slice/service type, SST) information, and optionally, may further include slice differentiator (slice differentiator, SD) information. The SST information is used to indicate behavior of a network slice, for example, a feature and a service type of the network slice. The SD information is complementary information of the SST. If the SST indicates implementation of a plurality of network slices, the SD may be corresponding to a unique network slice instance.

It should be understood that if the network side allows, within the registration area (registration area) or the tracking area (tracking area) to which the source cell belongs, the UE to access a plurality of network slices, or for a public land mobile network PLMN (public land mobile network, PLMN), the network side allows, in the registration area or the tracking area to which the source cell belongs, the UE to access a plurality of network slices, the indication of the allowed network slice includes a plurality of pieces of allowed (allowed) S-NSSAI.

3. S-NSSAI group information, used to indicate grouping based on a feature. For example, all network slices of a common AMF that can be accessed by a UE device are used as an S-NSSAI group. NSSAI includes a plurality of pieces of S-NSSAI.

4. Temporary identifier (Temporary ID). Information about the temporary identifier is allocated by an AMF to UE already attached on a CN side, and the temporary ID may uniquely indicate an AMF.

5. (Radio) Access network network slice selection assistance information ((R)AN-NSSAI, R-NSSAI). The information indicates a group of specific S-NSSAI, that is, a group of specific S-NSSAI. It should be understood that if the network side allows, within the registration area (registration area) or the tracking area (tracking area) to which the source cell belongs, the UE to access a plurality of network slices, or for a public land mobile network PLMN (public land mobile network, PLMN), the network side allows, in the registration area or the tracking area to which the source cell belongs, the UE to access a plurality of network slices, an indication of an allowed network slice may include an identifier of a set of the plurality of pieces of allowed (allowed) R-NSSAI.

6. Allowed (allowed) NSSAI. The allowed NSSAI indicates an NSSAI that a network allows a terminal device to access in a current registration area.

It should be understood that a specific encoding form of allowed network slice information is not limited. Certainly, in addition to the foregoing identifiers, the network slice information may be another identifier. This is not limited herein. If the network side allows the UE to access a plurality of network slices, the indication of the allowed network slice may be in a list form of the indication of the allowed network slice, for example, an allowed network slice selection assistance information list (allowed Network Slice Selection Assistance Information list, allowed NSSAI list), or an allowed single network slice selection assistance information list (allowed Single Network Slice Selection Assistance Information list, allowed S-NSSAI list).

In the embodiments of this application, all network slices may represent the network slice information by using at least one of the foregoing parameters. For example, the network slice information may be represented by using a network slice type, or may be represented by using a network slice type and a service type, or may be represented by using a service type and tenant information. This is not limited in the embodiments of this application. How to represent the network slice information of the network slice is not described in detail in the following. It should be understood that if a terminal device, an access network device, or a core network device supports a plurality of network slices, indication information of a network slice supported by the terminal device, the access network device, or the core network device may be represented in a list form of at least one of the foregoing identifiers.

The technical solutions of this application may be applied to a 5th generation mobile communications (the 5th Generation mobile communication technology, 5G) system or a further developed mobile communications system, and may be further applied to various forms of systems including some functions in a base station, where the functions are separated in various forms.

In the embodiments of this application, sequence numbers of the processes do not mean execution sequences. The execution sequences of the processes should be determined based on functions and internal logic of the processes, and shall not constitute any limitation on the implementation processes of the embodiments of this application.

In addition, the term "and/or" in this specification describes only an association for describing associated objects and represents that three relationships may exist. For example, A and/or B may represent the following three cases: Only A exists, both A and B exist, and only B exists. In addition, the character "/" in this specification usually represents an "or" relationship between the associated objects.

All or some of the foregoing embodiments may be implemented by using software, hardware, firmware, or any combination thereof. When implemented by using the software, the embodiments may be implemented completely or partially in a form of a computer program product. The computer program product includes one or more computer instructions. When the computer program instruction is loaded and executed on a computer, the procedures or functions according to the embodiments of this application are completely or partially generated. The computer may be a general-purpose computer, a special-purpose computer, a computer network, or another programmable apparatus. The computer instruction may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semi-conductor medium (for example, a solid-state drive Solid State Disk (SSD)), or the like.

The objectives, technical solutions, and benefits of this application are further described in detail in the foregoing specific embodiments. It should be understood that the foregoing descriptions are merely specific embodiments of this application, but are not intended to limit the protection scope of this application. Any modification, equivalent replacement, improvement, or the like made based on the technical solutions of this application shall fall within the protection scope of this application.

What is claimed is:

1. A communication method, comprising:
   sending, by a centralized unit user plane (CU-UP) of an access network to a centralized unit control plane (CU-CP) of the access network, an interface setup request message to request to setup an E1 interface, the interface setup request message comprises an identity of a public land mobile network (PLMN) served by the CU-UP and a network slice identifier corresponding to the public land mobile network, wherein the network slice identifier identifies single network slice selection assistance information (S-NSSAI) or an S-NSSAI list; and
   sending, by the CU-CP, an interface setup response message to the CU-UP after receiving the interface setup request message.

2. The communication method according to claim 1, wherein
   the interface setup request message further comprises service range information of the CU-UP, and the service range information comprises an identity of a cell served by the CU-UP.

3. The communication method according to claim 1, wherein the interface setup request message further comprises capacity information indicating a processing capacity of the CU-UP.

4. The communication method according to claim 3, wherein the capacity information comprises at least one of the following: information about an available resource of the CU-UP or load information of the CU-UP, and wherein the available resource comprises at least one of a computing resource, a software resource, a storage resource, or a port resource.

5. The communication method according to claim 1, wherein the CU-CP sends, to a core network, information about a network slice supported by the CU-CP and the CU-UP.

6. The communication method according to claim 1, wherein the CU-CP receives an F1 interface setup request message from a distributed unit (DU) of the access network, and the F1 interface setup request message comprises identification information of an access network notification area (RNA) to which a cell served by the DU belongs.

7. The communication method according to claim 6, wherein the identification information of the RNA comprises an RNA code.

8. The communication method according to claim 7, wherein the identification information of the RNA further comprises a PLMN identity.

9. The communication method according to claim 6, wherein information about the RNA is distinguished by cell granularity.

10. A communication system, comprising:
    a centralized unit user plane (CU-UP) of an access network; and
    a centralized unit control plane (CU-CP) of the access network; wherein
      the CU-UP is configured to send an interface setup request message to the CU-CP to request to set up an E1 interface, the interface setup request message comprises an identity of a public land mobile network (PLMN) served by the CU-UP and a network slice identifier corresponding to the public land mobile network, wherein the network slice identifier identifies single network slice selection assistance information (S-NSSAI) or an S-NSSAI list; and
      the CU-CP is configured to send an interface setup response message to the CU-UP after receiving the interface setup request message.

11. The communication system according to claim 10, wherein
    the interface setup request message further comprises service range information of the CU-UP, and the service range information comprises an identity of a cell served by the CU-UP.

12. The communication system according to claim 10, wherein the interface setup request message further comprises capacity information indicating a processing capacity of the CU-UP.

13. The communication system according to claim 12, wherein the capacity information comprises at least one of the following: information about an available resource of the CU-UP or load information of the CU-UP, and wherein the available resource comprises at least one of a computing resource, a software resource, a storage resource, or a port resource.

14. The communication system according to claim 10, wherein the CU-CP sends, to a core network, information about a network slice supported by the CU-CP and the CU-UP.

15. The communication system according to claim 10, wherein the CU-CP receives an F1 interface setup request message from a distributed unit (DU) of the access network, and the F1 interface setup request message comprises identification information of an access network notification area RNA to which a cell served by the DU belongs.

16. The communication system according to claim 15, wherein the identification information of the RNA comprises an RNA code.

17. The communication system according to claim 16, wherein the identification information of the RNA further comprises a PLMN identity.

18. The communication system according to claim 15, wherein information about the RNA is distinguished by cell granularity.

19. A communication apparatus, comprising:
at least one processor and a non-transitory computer-readable storage medium coupled to the at least one processor and storing programming instructions for execution by the at least one processor, the programming instructions instruct the at least one processor to perform operations comprising:
sending an interface setup request message to a centralized unit control plane (CU-CP) entity of an access network to request to set up in the interface setup request message is an E1 interface, the interface setup request message comprises an identity of a public land mobile network (PLMN) served by the communication apparatus and a network slice identifier corresponding to the public land mobile network, wherein the network slice identifier identifies single network slice selection assistance information (S-NSSAI) or an S-NSSAI list; and
receiving, an interface setup response message from the CU-CP after the CU-CP receives the interface setup request message.

20. The communication apparatus of claim 19, wherein the operations further comprising:
receiving an F1 interface setup request message from a distributed unit (DU) of the access network, and the F1 interface setup request message comprises identification information of an access network notification area (RNA) to which a cell served by the DU belongs, the identification information of the RNA comprises an RNA code and a PLMN identity.

* * * * *

UNITED STATES PATENT AND TRADEMARK OFFICE
CERTIFICATE OF CORRECTION

| | |
|---|---|
| PATENT NO. | : 11,330,645 B2 |
| APPLICATION NO. | : 16/992787 |
| DATED | : May 10, 2022 |
| INVENTOR(S) | : Jin et al. |

It is certified that error appears in the above-identified patent and that said Letters Patent is hereby corrected as shown below:

In the Claims

In Column 31 Line 15, In Claim 19, before "of" delete "entity".

Signed and Sealed this
Ninth Day of August, 2022

*Katherine Kelly Vidal*

Katherine Kelly Vidal
*Director of the United States Patent and Trademark Office*